United States Patent
Kim et al.

(10) Patent No.: US 9,051,431 B2
(45) Date of Patent: Jun. 9, 2015

(54) POLY(ARYLENE)-BASED ANION EXCHANGE POLYMER ELECTROLYTES

(71) Applicant: Los Alamos National Security, LLC, Los Alamos, NM (US)

(72) Inventors: Yu Seung Kim, Los Alamos, NM (US); Chulsung Bae, Watervliet, NY (US)

(73) Assignee: LOS ALAMOS NATIONAL SECURITY, LLC, Los Alamos, NM (US)

( * ) Notice: Subject to any disclaimer, the term of this patent is extended or adjusted under 35 U.S.C. 154(b) by 59 days.

(21) Appl. No.: 13/800,038

(22) Filed: Mar. 13, 2013

(65) Prior Publication Data

US 2014/0275300 A1    Sep. 18, 2014

(51) Int. Cl.
*C08G 75/20* (2006.01)
*C08G 75/00* (2006.01)

(52) U.S. Cl.
CPC ........................................ *C08G 75/20* (2013.01)

(58) Field of Classification Search
CPC .......................................................... C08G 75/20
USPC ............................................ 528/391; 521/25
See application file for complete search history.

(56) References Cited

U.S. PATENT DOCUMENTS

| | | | |
|---|---|---|---|
| 7,439,275 B2 | 10/2008 | Pivovar et al. | |
| 7,582,683 B2 | 9/2009 | Pivovar et al. | |
| 8,008,361 B2 | 8/2011 | Zhuang et al. | |

OTHER PUBLICATIONS

Hossain et al; Comparation of—quaternary ammonium hydroxides; Feb. 2013; Elsevier Ltd; Chem Abstract 160:358271.*
Chempath et al., "Mechanism of Tetraalkylammonium Headgroup Degradation in Alkaline Fuel Cell Membranes," J. Phys. Chem. C, Feb. 2008, vol. 112, pp. 3179-3182.
Fujimoto et al., "Backbone stability of quaternized polyaromatics for alkaline membrane fuel cells," J. Memb. Sci., Dec. 2012, vol. 423, pp. 438-449.
Hibbs et al., Chem. Mater., "Transport Properties of Hydroxide and Proton Conducting Membranes," Mar. 2008, vol. 20, pp. 2566-2573.
Li et al., "A Novel Bisphenol Monomer with Grafting Capability and the Resulting Poly(arylene ether sulfone) s,"Macromolecules, Sep. 2006, vol. 39, pp. 6990-6996.
Lu et al., "Alkaline polymer electrolyte fuel cells completely free from noble metal catalysts," PNAS, Dec. 2008, vol. 105, pp. 20611-20614.
Pan et al., "High-Performance Alkaline Polymer Electrolyte for Fuel Cell Applications," Adv. Funct. Mater. 2010, vol. 20, pp. 312-319.
Sata et al., "Change of anion exchange membranes in aqueous sodium hydroxide solution at high temperature," J. Memb. Sci., Apr. 1996, vol. 112, pp. 161-170.
Spendelow et al., A. Phys. Chem. Chem. Phys, May 2007, vol. 9, pp. 2654-2675.
Varcoe et al., "Prospects for Alkaline Anion-Exchange Membranes in Low Temperature Fuel Cells," Fuel Cells, Apr. 2005, vol. 5, pp. 187-200, first published online Oct. 2004.
Wang et al., "Synthesis of Soluble Poly(arylene ether sulfone) Ionomers with Pendant Quaternary Ammonium Groups for Anion Exchange Membranes," Macromolecules, Sep. 2009, vol. 42, pp. 8711-8717.
Yan et al., "Anion Exchange Membranes by Bromination of Benzylmethyl-Containing Poly(sulfone)s," Macromolecules, Feb. 2010, vol. 43, pp. 2349-2356.
Zhou et al., "Cross-linked, epoxy-based anion conductive membranes for alkaline membrane fuel cells," J. Memb. Sci., Jan. 2010, vol. 350, pp. 286-292.
Zschocke et al., "Novel ion exchange membranes based on an aromatic polyethersulfone," J. Memb. Sci., Feb. 1985, vol. 22, pp. 325-332.
Hossain, et al., "Comparison of alkaline fuel cell membrances of random & block poly(arylene ether sulfone) copolymers containing tetra quaternary ammonium hydroxides," International Journal of Hydrogen Energy, vol. 39(6), pp. 2731-2739, (2014).

* cited by examiner

*Primary Examiner* — Duc Truong
(74) *Attorney, Agent, or Firm* — Samuel L. Borkowsky

(57) ABSTRACT

Poly(arylene) electrolytes including copolymers lacking ether groups in the polymer may be used as membranes and binders for electrocatalysts in preparation of anodes for electrochemical cells such as solid alkaline fuel cells.

4 Claims, No Drawings

POLY(ARYLENE)-BASED ANION EXCHANGE POLYMER ELECTROLYTES

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to poly(arylene)-based anion exchange polymer electrolytes and to membranes and fuel cells that include these electrolytes.

BACKGROUND OF THE INVENTION

Fuel cells convert the chemical energy of fuel into electrical energy. A polymer electrolyte fuel cell is a type of fuel cell that has a simple design and 1) uses a fuel such as hydrogen, dimethyl ether, methanol, ethanol, etc. that can be easily delivered to the cell, 2) has cation exchange membranes that conduct hydrogen ions (i.e. protons), 3) has an electrocatalyst made from precious metals (Pt, for example), and 4) operates under acidic conditions. Under these conditions, the reduction of oxygen and/or the oxidation of the fuel are relatively slow. By contrast, an alkaline fuel cell is a type of fuel cell that operates under alkaline conditions and can make use of electrocatalysts made from base metals (i.e. non-precious metals) that are far less expensive then precious metals. Moreover, the base metal electrocatalysts tend to have a high oxygen reduction reaction activity under alkaline conditions. A solid alkaline fuel cell is a type of alkaline fuel cell that makes use of solid electrolytes instead of liquid electrolytes. A solid alkaline fuel cell has a simple design (e.g. no liquid electrolyte and hence no liquid electrolyte circulation system needed), and a smaller volume compared to liquid electrolyte based fuel cells. The solid electrolyte is less corrosive than a liquid electrolyte. Some of the current disadvantages of solid alkaline fuel cells relate to their membranes, which are anion conducting membranes that have relatively low anion conductivities, poor mechanical properties, and low stability under high pH alkaline environments.

Poly(arylene) anion exchange membranes made from poly(arylene) anion exchange polymer electrolytes are reported to have excellent ion conductivity, mechanical strength, and processibility. A poly(arylene) anion exchange membrane reported by Zschocke et al. in "Novel ion exchange membranes based on an aromatic polyethersulfone" Journal of Membrane Science, vol. 22 (1985), pp. 325-332, had the following repeating structure that includes ether linkages, sulfone linkages, and cationic alkylammonium moieties attached to arylene groups of the polymer chain:

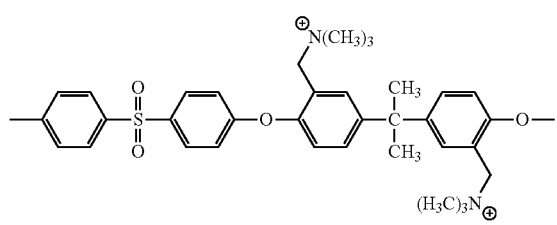

Sata et al. in "Change of anion exchange membranes in an aqueous sodium hydroxide solution at high temperature," Journal of Membrane Science, vol. 112 (1996) pp. 161-170, reported that membranes with the above repeating structure became brittle after immersion in 6.0 N sodium hydroxide solution at 80° C.

U.S. Pat. No. 8,008,361 discloses preparation ether-based poly(arylene) membranes which are prepared by forming a chloromethylated polymer, converting the chloromethylated polymer to an aminated polymer, and then alkylating the aminated polymer to a quaternary ammonium polymer and then casting the quaternary ammonium polymer into a film for a membrane. The chemical stability of these ether-based membranes has been reported to be poor under high pH environments, and the mechanical strength of these materials gradually deteriorated. Fujimoto et al. in "Backbone stability of quaternized polyaromatics for alkaline membrane fuel cells" Journal of Membrane Science, vol. 423-424 (2012), pp. 438-449 indicated that ether cleavage of benzyl ammonium group occurs under high pH conditions before possible cation degradation.

SUMMARY OF THE INVENTION

In accordance with the purposes of the present invention, as embodied and broadly described herein, an aspect of the present invention relates to a polymer compositions that do not have ether linkages. Embodiment membranes include a repeating unit of the formula

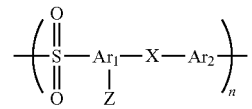

wherein $Ar_1$ and $Ar_2$ are independently selected from divalent aromatic or divalent heteroaromatic groups, wherein $Ar_1$ and $Ar_2$ are optionally substituted with one or more monovalent organic groups, wherein X is independently selected from $-(SO_2)-$, $-S-$, $-C(CH_3)_2-$, and $-(C=O)-$, wherein Z is a cationic functional group selected from alkylammonium, alkylphosphonium, and alkylguanidinium, and wherein n is an integer from 10 to 10,000.

Another aspect of the invention relates to a composition comprising a copolymer having the formula

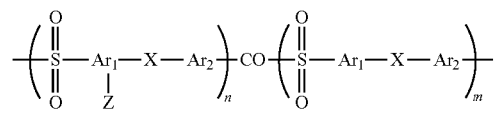

wherein $Ar_1$ and $Ar_2$ are 1,4-phenylene, wherein X is $-(SO_2)-$, $-S-$, $-C(CH_3)_2-$, and $-(C=O)-$, wherein Z is independently selected from alkylammonium, alkylphosphonium, and alkylguanidinium, and wherein n and m are integers from 10 to 10,000.

Several non-limiting embodiments of the above copolymer include the following copolymers in which n is from 10 to 10,000 and m is from 10 to 10,000:

Copolymer 1

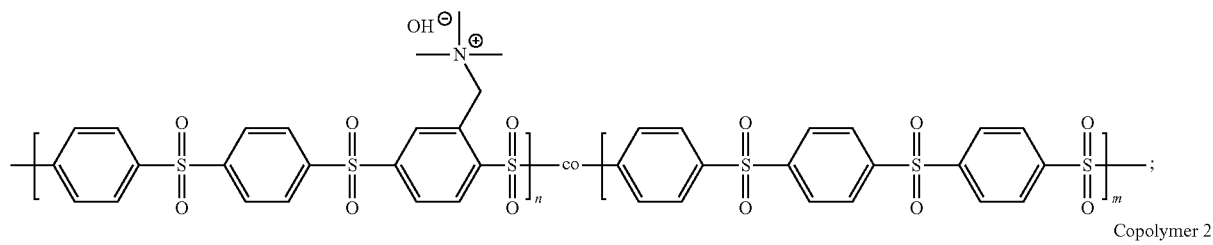

Copolymer 2

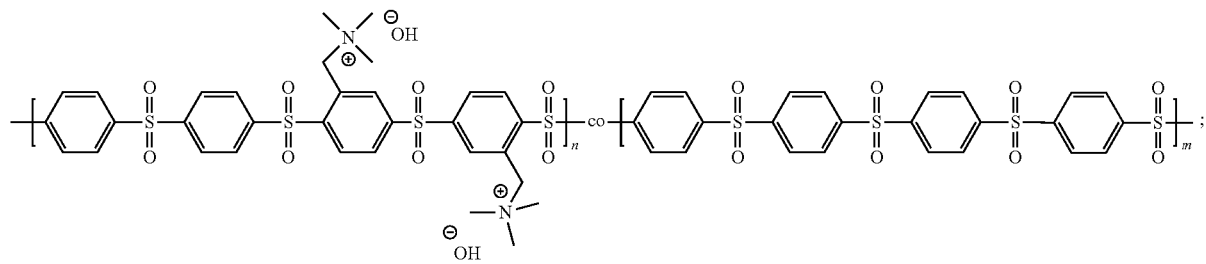

Copolymer 3

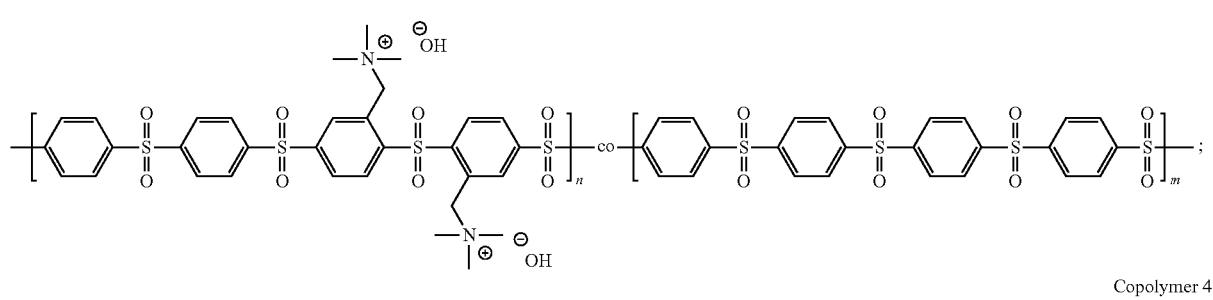

Copolymer 4

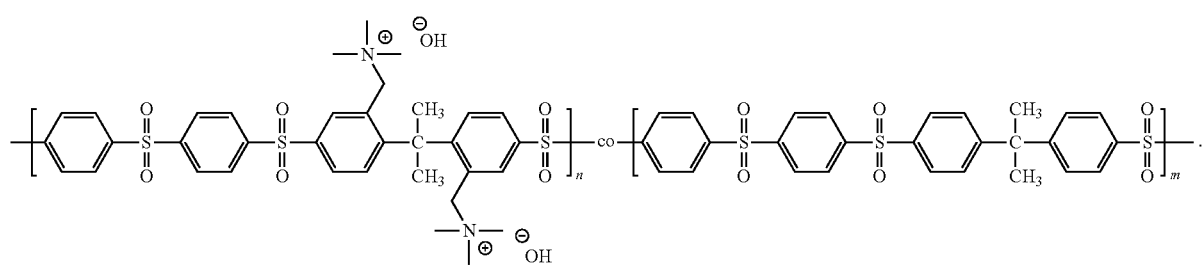

DETAILED DESCRIPTION

This invention relates to poly(arylene) electrolyte compositions. These compositions are expected to conduct anions such as hydroxide when they are used as membrane materials in solid alkaline fuel cells. These materials do not include ether linkages in the polymer and are therefore not expected to suffer from the types of degradation that ether-containing polymers have been reported to have. Some of these polymers include a repeating unit having the general formula:

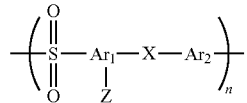

wherein $Ar_1$ and $Ar_2$ are independently selected from divalent aromatic or divalent heteroaromatic groups, wherein $Ar_1$ and $Ar_2$ are optionally substituted with one or more monovalent organic groups, wherein X is independently selected from —$(SO_2)$—, —S—, —$C(CH_3)_2$—, and —(C=O)—, wherein Z is independently selected from alkylammonium, alkylphosphonium, and alkylguanidinium, and wherein n is an integer from 10 to 10,000.

Another aspect of the invention relates to compositions comprising copolymers having the general formula

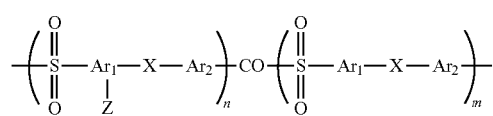

wherein $Ar_1$ and $Ar_2$ are 1,4-phenylene, wherein X is —$(SO_2)$—, —S—, —$C(CH_3)_2$—, and —(C=O)—, wherein Z is independently selected from alkylammonium, alkylphosphonium, and alkylguanidinium. The 'CO' in-between the two repeating units is meant to indicate that the formula represents a copolymer of n monomers of the first repeating unit and m monomers of the second repeating unit, wherein n and m are integers from 10 to 10,000

It is expected that some $Ar_1$ and $Ar_2$ suitable for poly(arylene) anion conducting polymer electrolytes of this invention include divalent aromatic or divalent heteroaromatic groups such as 1,2-phenylene, 1,3-phenylene, 1,4-phenylene, 4,4'-biphenylene, 4,4'thiobisphenylene, 2,2'-biphenylene, 2,2'-diphenylpropane, 2,2-diphenylhexafluoropropane, p-terphenylene, and 2,2',3,3',5,5',6,6'-octafluorobiphenylene.

It is expected that suitable cationic functional groups represented by Z in the formula include alkylammonium, alkylphosphonium, and guanidinium. Alkylammonium and alkylphosphonium includes alkyl groups such as, but not limited to, methyl, ethyl, propyl, isopropyl, butyl, phenyl, benzyl or combinations thereof.

Embodiment electrolytes may be prepared by direct polymerization using aminated and non-functionalized monomers, post-amination of halomethylated polymer, and post-amination of phenylfluorine-amine reactions.

Embodiment polymers are expected to have advantages compared to polymers having ether linkages related to greater chemical stability at high pH (e.g. pH>11.0). Embodiment polymers with sulfide group, sulfone groups, isopropyl group, ketone groups, or the combination of these groups are expected to be mechanically flexible compared to polymers with ether linkages. Embodiment polymers are expected to have a greater thermal stability than polymers having ether linkages.

Embodiment compositions include the following non-limiting copolymers, which are poly(arylene) anion exchange polymer electrolytes, in which n and m are each from 10 to 10,000:

Copolymer 1

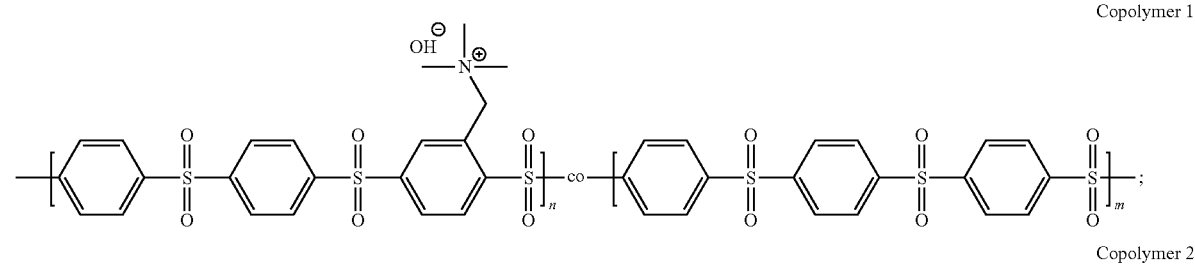

Copolymer 2

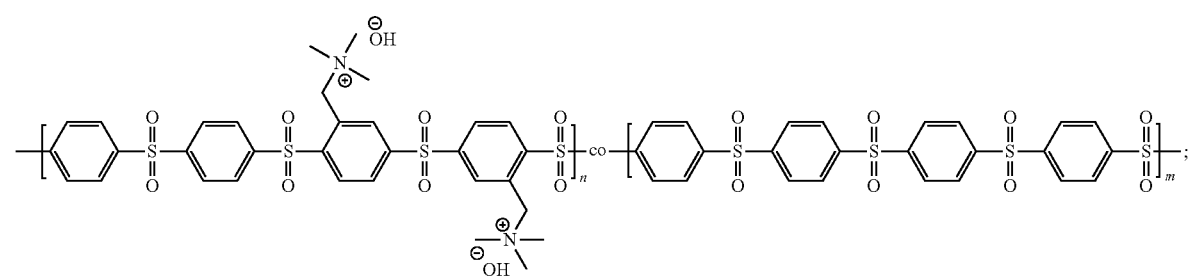

Copolymer 3

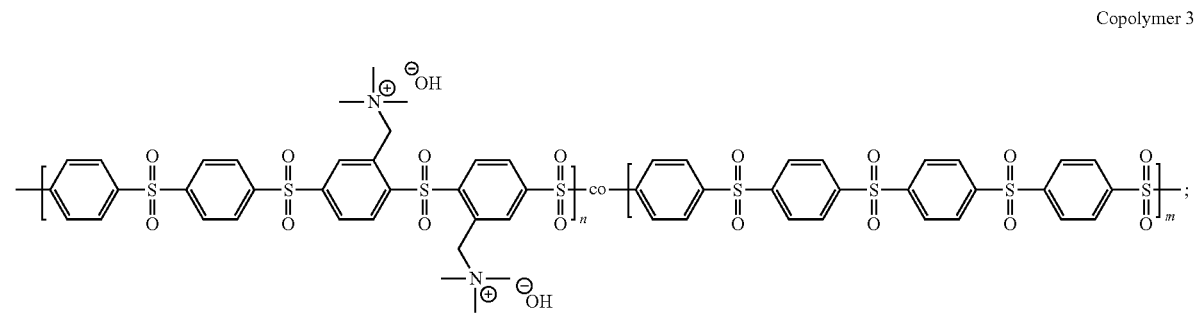

Copolymer 4

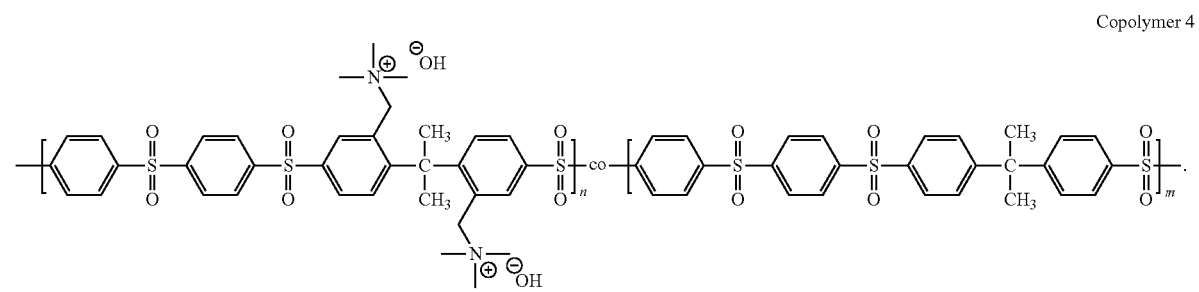

Scheme I below illustrates an embodiment synthesis for Copolymer 1:
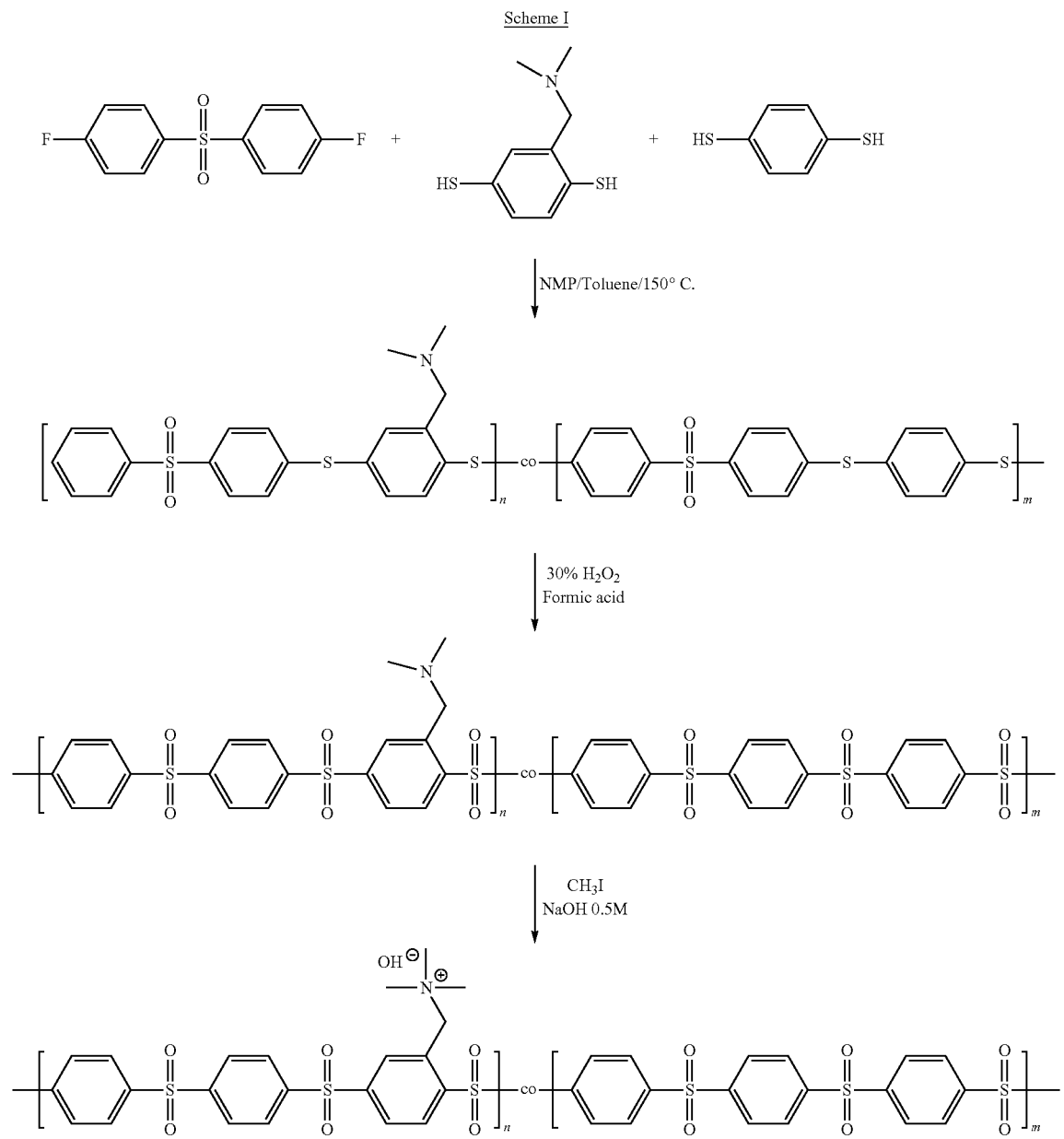
Scheme II below summarizes an embodiment synthesis for Copolymer 3. The details of the synthesis are provided below Scheme II.

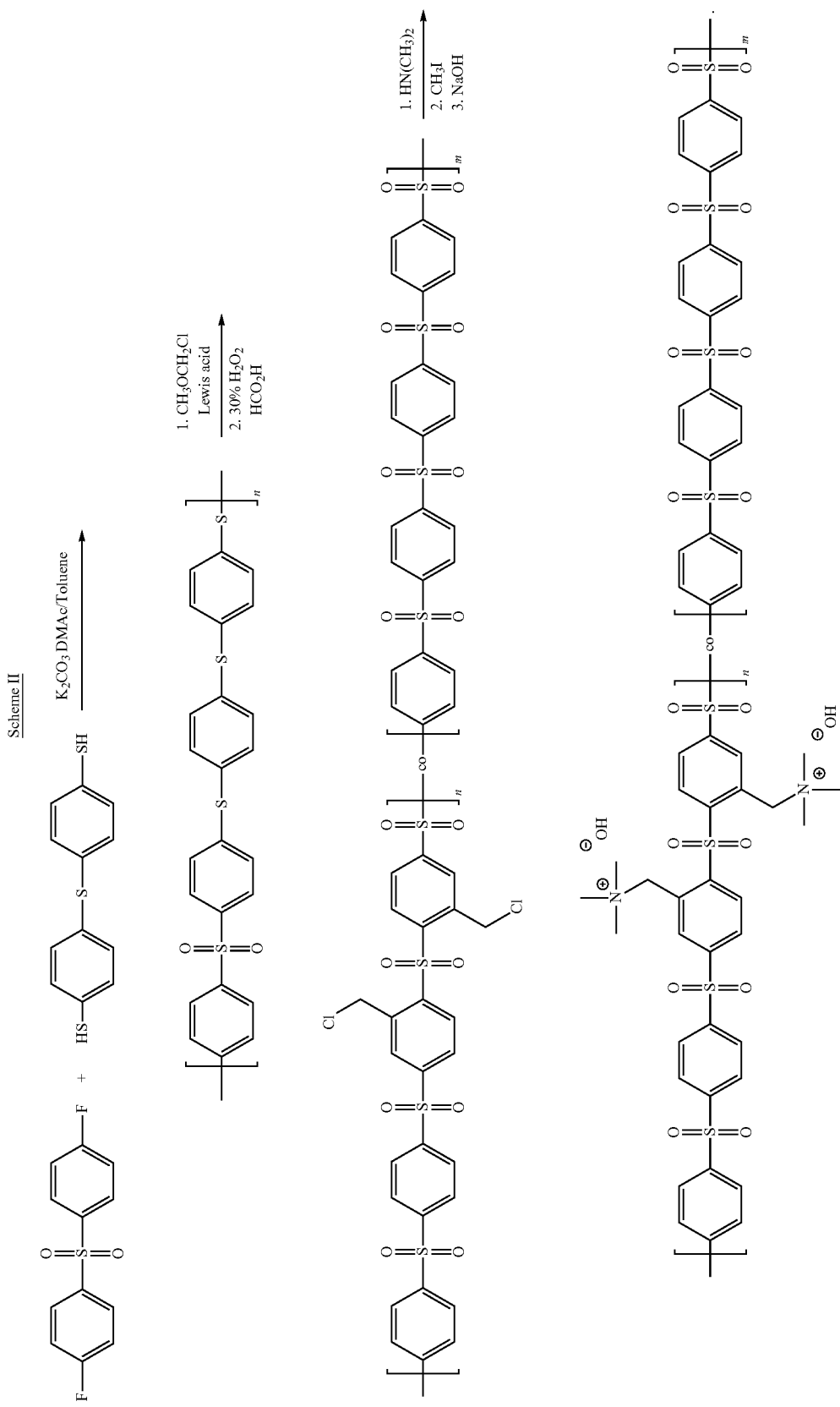

Thus, 4,4'-thiobisphenylene-based poly(arylene sulfone) anion exchange membranes were synthesized as follows: 10 mmol difluorodiphenylsulfone (DFS), 10 mmol diphenylsulfidethiol and 21 mmol $K_2CO_3$ were added into a three neck flask equipped with a magnetic stirrer, a Dean-Stark trap, and a nitrogen gas inlet. Then, 35 mL dimethylacetamide (DMAc) was charged into the reaction flask. The reaction mixture was heated to 145° C. After dehydration and removal of toluene, the reaction temperature was increased to about 165° C. The resulting polymer was washed thoroughly with water or with ethanol and dried under vacuum at 80° C. for 24 hours. The isolated polymers were chloromethylated using a mixture of $CH_3OCH_2Cl$ and a Lewis acid. Suitable Lewis acids include but are not limited to, $ZnCl_2$ and $SnCl_4$. Afterward, the sulfide bonds (—S—) in the polymer backbone were oxidized to sulfone (—$SO_2$—) using a mixture of 30% hydrogen peroxide and formic acid. The oxidized polymers were dissolved in 20 mL of dimethylsulfoxide (DMSO), and quaternized by treating with iodomethane at room temperature overnight. The iodide ion in the quaternized ammonium polymers was exchanged to hydroxide ion by immersing the polymer membrane in 1M NaOH solution and thoroughly washing the polymer with deionized water.

Scheme III below illustrates an embodiment synthesis of Copolymer 4. The details of the synthesis are provided below Scheme III.

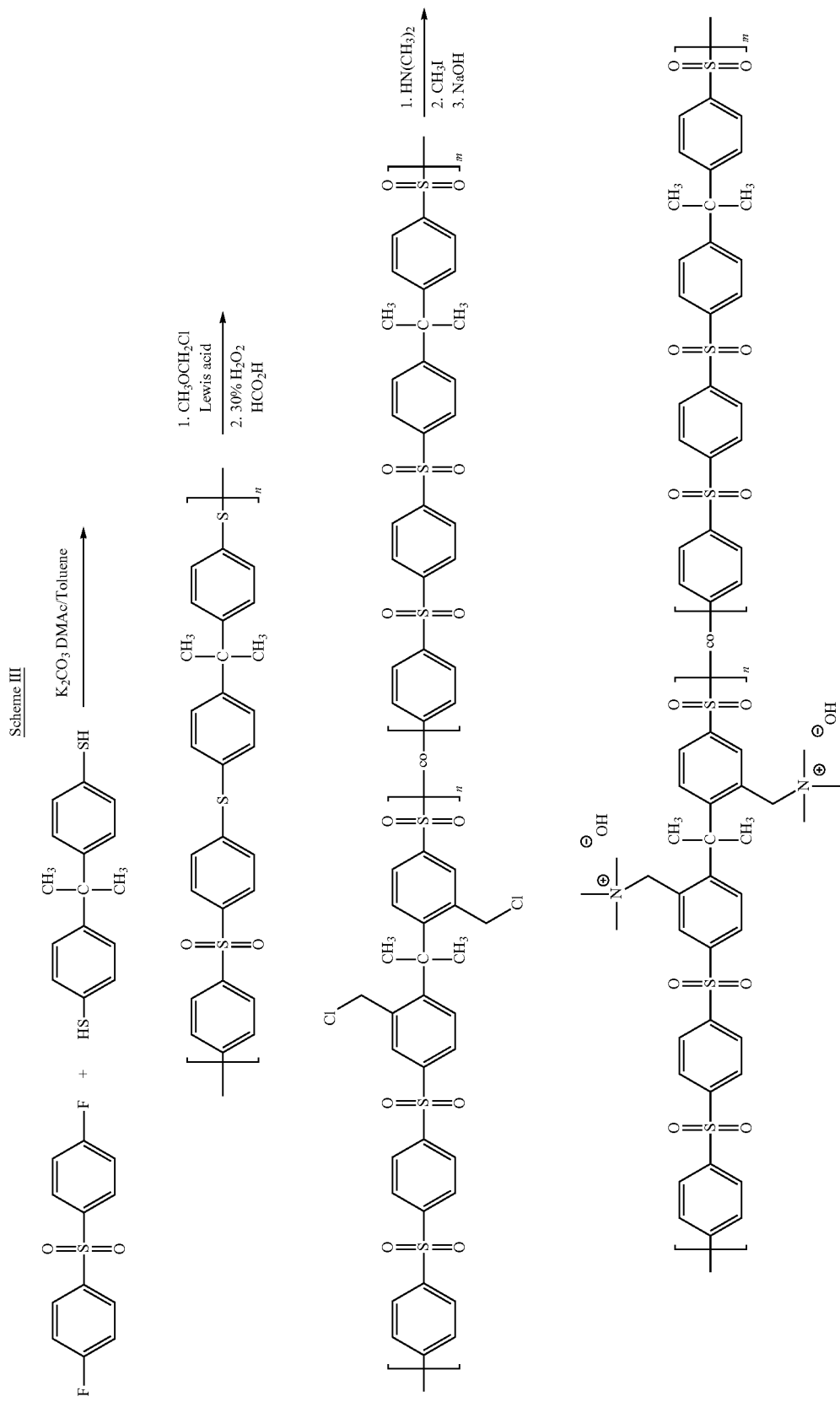

Thus, 4,4'-(1-methylethylidene)bisbenzene-based poly (arylene sulfone) anion exchange membranes were synthesized in a manner similar to that of the Copolymer 3 except that 4,4'-(1-methylethylidene)bisbenzenethiol (MBT) monomer was used instead of diphenylsulfidethiol (see Schemes III). MBT was synthesized from bisphenol A (See Scheme 4). 10 mmol DFS, 10 mmol MBT (shown in Schemes III) and 21 mmol $K_2CO_3$ were added into a three neck flask equipped with a magnetic stirrer, a Dean-Stark trap, and a nitrogen gas inlet. Then, 35 mL DMAc was charged into the reaction flask. The reaction mixture was heated to 145° C. After dehydration and removal of toluene, the reaction temperature was increased to about 165° C. The resulting polymer was washed thoroughly with water or ethanol several times and dried under vacuum at 80° C. for 24 hours. The isolated polymers were chloromethylated using a mixture of $CH_3OCH_2Cl$ and Lewis acid (ex: $ZnCl_2$, $SnCl_4$, etc) and the sulfide bonds (—S—) in the polymer backbone were oxidized to sulfone (—$SO_2$—) using a mixture of 30% hydrogen peroxide and formic acid. The oxidized polymers were dissolved in 20 mL of DMSO, and quaternized by treating with iodomethane at room temperature overnight. The iodide ion in the quaternized ammonium polymers was exchanged to hydroxide ion by immersing the polymer membrane in 1M NaOH solution and through washing with deionized water. The monomer 4,4'-(1-methylethylidene)bisbenzenethiol (MBT) which was used in SCHEME III was prepared according to the procedure shown in SCHEME IV below.

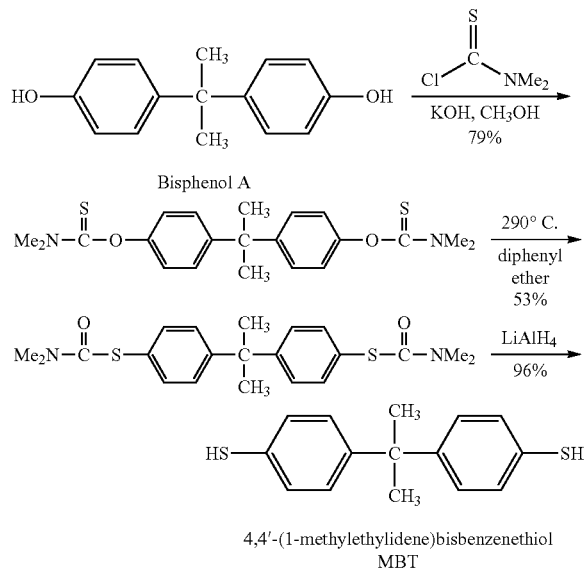

Scheme IV 4,4'-(1-methylethylidene)bisbenzenethiol
MBT

The anionic conductivity of an embodiment membrane can be measured in a hydroxide-rich environment by, for example, by boiling deionized water and purging $N_2$ gas in a temperature/humidity control chamber. Alternatively, a bicarbonate-rich environment may be obtained, for example, after 24 hours exposure of deionized water to ambient air.

The stability of embodiment poly(arylene) anion exchange polyelectrolyte membranes may be evaluated by, for example, immersion of the membrane into 0.5 M NaOH solution at 80° C. Changes in anionic conductivity can be measured over time. Other spectroscopic techniques, such as FT-IR may be used to evaluate changes in the polymer by changes in spectral features such as, for example, changes in band appearance for guanidinium and the appearance of new bands. Changes in the $^1H$ NMR spectra for embodiment membranes may also be used to evaluate the stability of membranes.

Embodiment poly(arylene) anion exchange polyelectrolyte of this invention can be used as binders for electrocatalysts in membranes, and their properties can be evaluated under reasonable operating conditions for fuel cells. Their electrochemical properties can be evaluated by obtaining and plotting data, such as making plots of cell voltage (volts) versus current density (A/cm$^2$) and evaluated, for example, the current drawing capabilities using electrocatalysts under $H_2/O_2$ conditions at elevated temperatures while keeping abreast of the stabilities of the membranes.

Other techniques may also be used to evaluate the stabilities of the embodiment poly(arylene) anion exchange polyelectrolyte membranes of this invention.

Embodiment membranes of poly(arylene) anion exchange polymer electrolytes can be used with electrocatalysts in a membrane electrode assembly (MEA). The term "catalyst" means a catalyst that when incorporated into electrode facilitates an electrochemical reaction. These catalysts are also referred to as "electrocatalysts". The catalyst may be applied in the form of a dispersion of the catalyst known as an ink. The catalyst may be applied to the polymer using a method such as direct painting of catalyst ink on to membrane, decal transfer, spray painting, screen printing, roll coating, hot pressing, and the like. Concentrations of the polymer electrolytes in the liquid medium is not particularly limited, and may be properly determined depending on a combination of the solvent and said compounds, amounts used to the electrode catalyst, viscosity, permeability at applying it, etc., but it is preferably 0.1 to 20 mass %, particularly preferably 0.5 to 10 mass %, as a total mass % of both of the compounds in a liquid medium. Using these fabrication methods, highly stable and durable interface between membrane and electrode can be obtained. Platinum black catalysts (Johnson Matthey) could be used for preparing electrodes. Double-sided hydrophobic carbon cloths available from E-TEK, Inc., for example, could be used as anode and cathode gas diffusion layers, respectively. Embodiment alkylammonium (e.g. tetraalylammonium) functionalized poly(arylene) anion exchange membranes having a thickness of, for example, 50 μm, could be used as anion exchange membranes. Catalyst inks could be painted on the membrane surface with a suitable loading (e.g. anode: 3.4 and cathode 6.5 mg/cm$^2$). The MEA could then be immersed into, for example, 0.5 M NaOH solution for 1 h, following a washing with water at 80° C. several times. Initial polarization curves for the MEA using could be obtained after some amount of break in (15 hours, for example) at some temperature (e.g. 60 or 80° C.). An iR-free cell voltage, $E_{iR-free}$ could be determined by on-line high frequency resistance measurements. An AMFC life test could be performed under constant voltage (e.g. 0.3 V at 60° C.) under fully hydrated conditions. After several hundred hours, polarization curves could be obtained under fully humidified conditions.

Embodiments of the invention also include hydrogen/air fuel cells or hydrogen/oxygen fuel cells. The anode of a $H_2$/air fuel cell sometimes referred to as the hydrogen electrode. The cathode is sometimes referred to as the oxygen electrode. In an embodiment, an anode of a SAFC is a composite a catalyst (e.g. carbon, transition metal(s), oxides of transition metal(s), and the like) and an ionomer binder that is an embodiment poly(arylene)-based anion exchange polymer.

In summary, poly(arylene) anion exchange polymer electrolytes and membranes that include sulfone and perhaps carbonyl moieties in between aromatic and/or heteroaromatic groups are expected to be more durable than currently available polymers having ether linkages between aromatic groups. They are expected to be highly efficient conductors of anions and are expected to exhibit stability under high pH (e.g. pH>10.0) conditions. The polymer electrolytes are expected to act as binders for electrocatalysts such as precious metal electrocatalysts and base metal catalysts. They are expected to be useful as membranes in electrochemical cells such as fuel cells.

Although the present invention has been described with reference to specific details, it is not intended that such details should be regarded as limitations upon the scope of the invention, except as and to the extent that they are included in the accompanying claims.

What is claimed is:

1. A copolymer having the formula

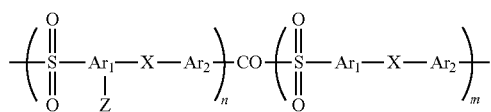

wherein $Ar_1$ and $Ar_2$ are independently selected from 1,2-phenylene, 1,3-phenylene, 1,4-phenylene, 4,4'-biphenylene, 4,4'thiobisphenylene, 2,2'-biphenylene, 2,2'-diphenylpropane, 2,2-diphenylhexafluoropropane, p-terphenylene, and 2,2',3,3',5,5',6,6'-octafluorobiphenylene, wherein X is —($SO_2$)— wherein Z is independently selected from alkylammonium, alkylphosphonium, and guanidinium, and wherein n and m are integers from 10 to 10,000.

2. The copolymer of claim 1, wherein Z comprises methyl, ethyl, propyl, isopropyl, butyl, phenyl, benzyl or combinations thereof.

3. The copolymer of claim 1, wherein X is —($SO_2$)—, wherein $Ar_1$ and $Ar_2$ are 1,4-phenylene, wherein Z is trialkylammonium attached to $Ar_1$ with —($CH_2$)—.

4. A copolymer composition having the formula

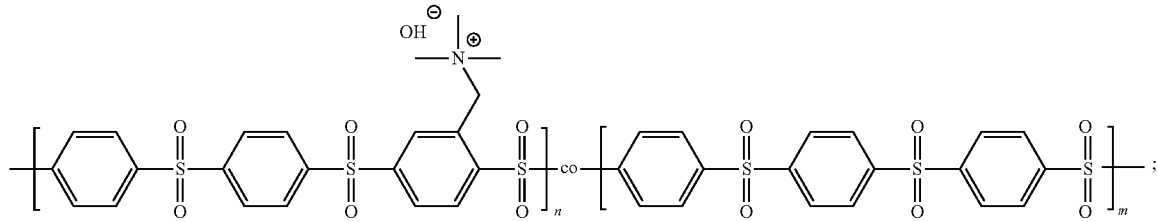

or having the formula

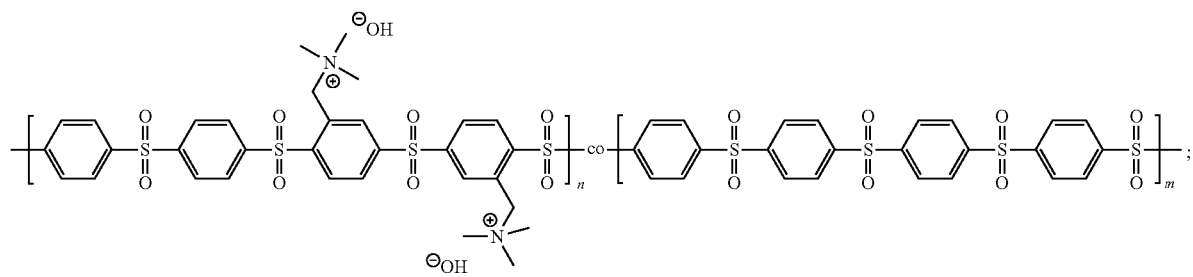

or having the formula

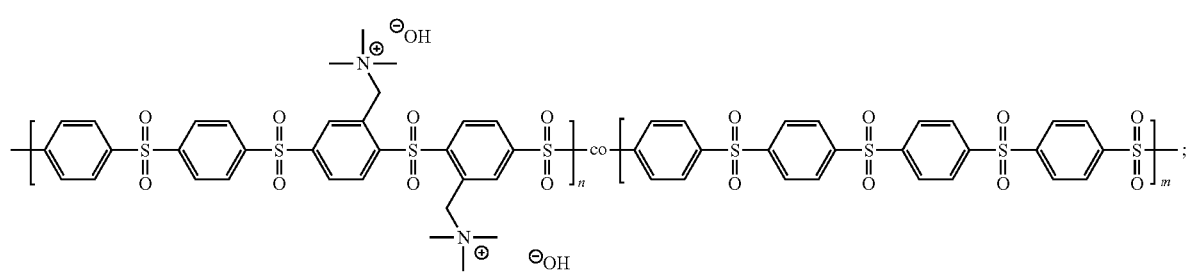

or having the formula
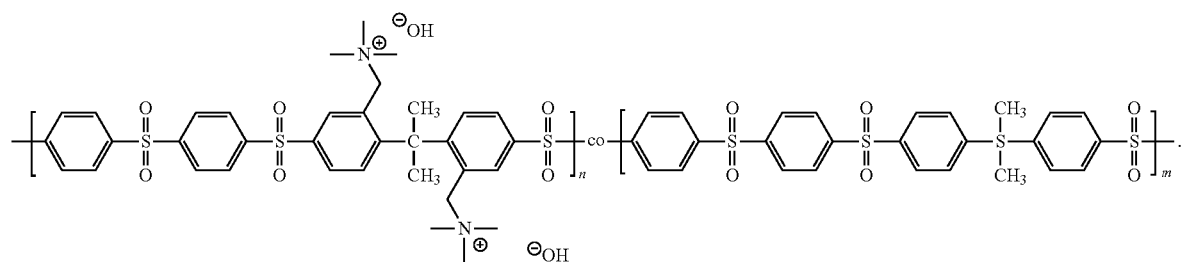
* * * * *